United States Patent
Kaneko et al.

(10) Patent No.: US 12,270,367 B2
(45) Date of Patent: Apr. 8, 2025

(54) ENGINE CONTROL DEVICE AND VEHICLE

(71) Applicants: Isuzu Motors Limited, Yokohama (JP); Nikki Co., Ltd., Kanagawa (JP)

(72) Inventors: Shinichiro Kaneko, Fujisawa (JP); Misao Tanaka, Yokohama (JP); Koji Goto, Fujisawa (JP); Buso Takigawa, Kanagawa (JP); Ryota Adachi, Kanagawa (JP)

(73) Assignees: Isuzu Motors Limited, Yokohama (JP); Nikki Co., Ltd., Kanagawa (JP)

( * ) Notice: Subject to any disclaimer, the term of this patent is extended or adjusted under 35 U.S.C. 154(b) by 0 days.

(21) Appl. No.: 18/701,678

(22) PCT Filed: Oct. 18, 2022

(86) PCT No.: PCT/JP2022/038777
§ 371 (c)(1),
(2) Date: Apr. 16, 2024

(87) PCT Pub. No.: WO2023/068274
PCT Pub. Date: Apr. 27, 2023

(65) Prior Publication Data
US 2024/0418140 A1     Dec. 19, 2024

(30) Foreign Application Priority Data
Oct. 18, 2021   (JP) ................. 2021-170414

(51) Int. Cl.
*F02P 5/152*    (2006.01)
*F02D 19/02*    (2006.01)
*F02D 41/00*    (2006.01)
*F02M 21/02*    (2006.01)

(52) U.S. Cl.
CPC .............. *F02P 5/152* (2013.01); *F02D 19/02* (2013.01); *F02D 41/0027* (2013.01); *F02M 21/02* (2013.01)

(58) Field of Classification Search
CPC .... F02P 5/152; F02D 19/029; F02D 41/0027; F02D 2200/0611; F02D 2200/0612
See application file for complete search history.

(56) References Cited

U.S. PATENT DOCUMENTS 4,774,922 A * 10/1988 Morita ................. F02P 5/1523
123/406.29
6,412,472 B1 * 7/2002 Tilagone ............... F02D 19/029
123/406.44

(Continued)

FOREIGN PATENT DOCUMENTS

DE   102016220023 A1 * 4/2018 ......... F02D 41/0027
JP   08-158950         6/1996

(Continued)

*Primary Examiner* — John M Zaleskas

(57) ABSTRACT

Provided are an engine control device and a vehicle with which the methane number of LNG fuel can be estimated. The engine control device is capable of using liquefied natural gas as fuel, and is provided with an acquisition unit that acquires an ignition retard control amount for avoiding engine knocking, and an estimating unit that estimates the methane number of the liquefied natural gas on the basis of an index value indicating the acquired ignition retard control amount.

3 Claims, 3 Drawing Sheets

(56) References Cited

U.S. PATENT DOCUMENTS

| | | | | |
|---|---|---|---|---|
| 2008/0306672 | A1* | 12/2008 | Bauer | F02D 41/3035 |
| | | | | 123/295 |
| 2011/0114058 | A1* | 5/2011 | Cohn | F02B 43/00 |
| | | | | 123/436 |
| 2016/0010581 | A1* | 1/2016 | Sixel | F02D 41/3005 |
| | | | | 123/445 |
| 2016/0208764 | A1* | 7/2016 | Mann | F02P 5/152 |
| 2017/0101948 | A1* | 4/2017 | Kunkel | F02B 43/04 |
| 2017/0218837 | A1* | 8/2017 | Zhong | F02B 43/12 |
| 2020/0355098 | A1* | 11/2020 | Rickert | F02D 19/029 |
| 2024/0410329 | A1* | 12/2024 | Kaneko | F02D 41/042 |

FOREIGN PATENT DOCUMENTS

| | | |
|---|---|---|
| JP | 2003-148187 | 5/2003 |
| JP | 2004-162649 | 6/2004 |
| JP | 2011-012551 | 1/2011 |
| JP | 2012-082741 | 4/2012 |
| JP | 2016-109016 | 6/2016 |
| WO | WO-2022264795 A1 * | 12/2022 |

* cited by examiner

ENGINE CONTROL DEVICE AND VEHICLE

TECHNICAL FIELD

The present disclosure relates to an engine control apparatus and a vehicle.

BACKGROUND ART

There is known an LNG vehicle in which an engine that uses liquefied natural gas (LNG) as a fuel is mounted. In the LNG vehicle, a tank for storing LNG is mounted. The LNG stored in the tank is supplied to the engine, and is burned and consumed in the engine (for example, see Patent Literature (hereinafter referred to as "PTL") 1).

CITATION LIST

Patent Literature

PTL 1
Japanese Patent Application Laid-Open No. H08-158950

SUMMARY OF INVENTION

Technical Problem

Incidentally, the LNG fuel (hereinafter referred to as the fuel) contains components such as methane, ethane, propane, and butane. The boiling points of the components differ from each other. The fuel in which boiloff of methane in the tank and a fuel property change (an increase in the percentage of heavier components) have occurred is the fuel in which methane has evaporated and the methane number has decreased, and thus, knocking is likely to occur in a case where the fuel is used as a fuel for the Otto cycle, which may result in deterioration of fuel efficiency and occurrence of engine failure, or the like.

When knocking occurs, the occurrence of knocking is avoided by calculating a signal from a knock sensor and performing ignition retard control for each cylinder.

When the methane number decreases due to the components contained in the LNG fuel and a change in property that represents the proportions of the components, ignition retard control is performed by using the occurrence of knocking as the starting point. Accordingly, in a case where a large change in the methane number occurs, excessive knocking may occur and malfunction of the engine may occur. For this reason, it is necessary to estimate the methane number.

An object of the present disclosure is to provide an engine control apparatus and a vehicle each capable of estimating the methane number of an LNG fuel.

Solution to Problem

In order to achieve the above-mentioned object, an engine control apparatus in the present disclosure is an engine control apparatus for an engine in which liquefied natural gas as a fuel is allowed to be used, and the engine control apparatus includes: an acquisition unit that acquires an ignition retard control amount for avoiding knocking in the engine; and an estimation unit that estimates, based on an index value indicating the acquired ignition retard control amount, a methane number of the liquefied natural gas.

A vehicle in the present disclosure includes the engine control apparatus described above.

Advantageous Effects of Invention

According to the present disclosure, it is possible to estimate the methane number of an LNG fuel.

DESCRIPTION OF EMBODIMENTS

Hereinafter, an embodiment of the present disclosure will be described with reference to the accompanying drawings.

Figure 1:
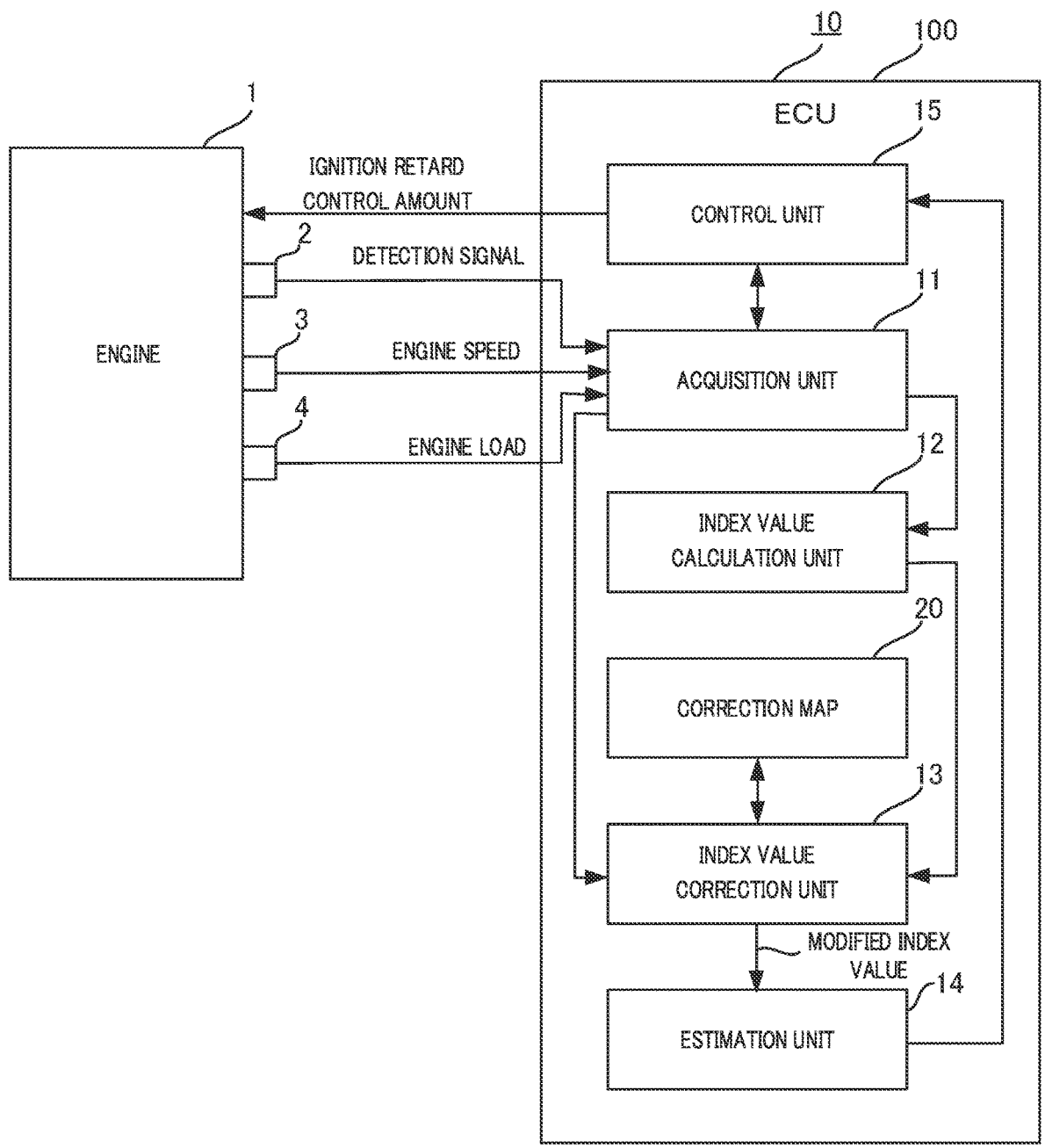
FIG. 1 schematically illustrates an exemplary configuration of an engine control apparatus in an embodiment of the present disclosure.

FIG. 1 schematically illustrates an exemplary configuration of engine control apparatus 10 in an embodiment of the present disclosure.

For example, an LNG fuel supply system (not illustrated) for supplying an LNG fuel to engine 1 is mounted in the vehicle. The LNG fuel supply system includes, for example, an LNG tank (not illustrated) for storing the LNG fuel, an LNG fuel supply path (not illustrated), a carburetor (not illustrated) for vaporizing the LNG fuel, an isolation valve (not illustrated) for opening and closing the LNG fuel supply path, and an LNG regulator (not illustrated) for reducing the pressure of the LNG fuel (gas) vaporized in the carburetor. The LNG fuel supply path connects the LNG tank to the LNG regulator via the isolation valve, and connects the LNG regulator to engine 1. Engine 1 is a spark-ignition internal combustion engine in which the vaporized LNG fuel (gas) is burned by ignition. Engine 1 includes a plurality of cylinders (not illustrated).

Note that, a CNG fuel supply system (not illustrated) for supplying compressed natural gas (CNG) to engine 1 may be further mounted in the vehicle. The CNG fuel supply system includes, for example, a CNG tank (not illustrated) for storing a CNG fuel, a CNG fuel supply path (not illustrated), an isolation valve (not illustrated) for opening and closing the CNG fuel supply path, and a CNG regulator (not illustrated) for reducing the pressure of the CNG fuel. The CNG fuel supply path connects the CNG tank to engine 1 via the isolation valve and the CNG regulator. In a case where the LNG fuel supply system and the CNG fuel supply system are mounted in the vehicle, it is possible to switch from the LNG fuel to the CNG fuel for use, for example, when the methane number of the LNG fuel decreases and engine 1 is in a high-load state.

Knock sensor 2 detects knocking in engine 1. Knock sensor 2 includes, for example, a piezoelectric element for detecting vibration of an engine block (not illustrated). Note that, the detection result of knock sensor 2 is inputted into control apparatus 10.

Crank angle sensor 3 detects the engine speed. Note that, the detection result of crank angle sensor 3 is inputted into control apparatus 10.

Torque sensor 4 detects the engine load based on the degree of rotational fluctuation of a crankshaft, for example. Note that, the engine load may be detected based on the gas pedal position or the throttle position. Further, the detection result of torque sensor 4 is inputted into control apparatus 10.

Control apparatus 10 performs various kinds of control such as correction of the ignition timing of a spark plug (not illustrated), and is formed of, for example, electronic control unit (ECU) 100. ECU 100 includes a central processing unit (CPU), a read only memory (ROM), a random access memory (RAM), an input port, an output port, and the like. The CPU develops a program stored in the ROM into the RAM to execute functions to be described later. Control apparatus 10 has functions as acquisition unit 11, index value calculation unit 12, index value correction unit 13, estimation unit 14, and control unit 15. Further, correction map 20 is stored in a storage unit (for example, the ROM) of ECU 100.

Acquisition unit 11 acquires the detection result from knock sensor 2. Further, acquisition unit 11 acquires the engine speed from crank angle sensor 3. Further, acquisition unit 11 acquires the engine load from torque sensor 4. Further, acquisition unit 11 acquires advance values (ignition retard control amounts) to be described later.

Control unit 15 calculates ignition retard control amounts in the plurality of cylinders, respectively, based on the detection result of knock sensor 2. Here, the ignition retard control amount refers to advance value) $\Delta\theta(°)$ with respect to the ignition timing. Control unit 15 corrects the ignition timing of the spark plug for each cylinder based on the advance value (ignition retard control amount).

In a case where advance value $\Delta\theta$ is 0, control unit 15 does not correct the ignition timing. In a case where advance value $\Delta\theta$ is $-\Delta\theta_1$, on the other hand, control unit 15 corrects the ignition timing such that the ignition timing is later than a predetermined ignition timing (an ignition timing at which correction is not performed) by $\Delta\theta_1$ (retarded by $\Delta\theta_1$). Further, in a case where advance value $\Delta\theta$ is $-\Delta\theta_2$, control unit 15 corrects the ignition timing such that the ignition timing is later than the predetermined ignition timing by $\Delta\theta_2$ (retarded by $\Delta\theta_2$). Here, in a case where the magnitudes of advance values $\Delta\theta$ are $0>-\Delta\theta_1>-\Delta\theta_2$, it is said that advance value (ignition retard control amount) $-\Delta\theta_1$ is lower than advance value 0. Further, it is said that advance value $-\Delta\theta_2$ is lower than advance value $-\Delta\theta_1$.

Index value calculation unit 12 calculates an average value of, among the acquired respective ignition retard control amounts in the plurality of cylinders, the respective ignition retard control amounts in two or more cylinders, where the respective ignition retard control amounts in the two or more cylinders are lower than the (respective) ignition retard control amount(s) in the other cylinder(s) among the plurality of cylinders.

For example, in a case where the advance values (ignition retard control amounts) in the plurality of cylinders are 0, $-\Delta\theta_1, \ldots, -\Delta\theta_{n-k}, -\Delta\theta_{n-(k-1)}, \ldots, -\Delta\theta_{n-1}, -\Delta\theta_n$, respectively, and the magnitudes of the advance values are $0>-\Delta\theta_1>, \ldots, -\Delta\theta_{-k}>-\Delta\theta_{n-(k-1)}, \ldots >-\Delta_{n-1}>-\Delta\theta_n$, respectively (where n and k are natural numbers), index value calculation unit 12 calculates an average value obtained by dividing the sum of the respective advance values $(-\Delta\theta_{n-(k-1)}, \ldots, -\Delta\theta_{n-1}, -\Delta\theta_n)$ in k cylinders by k, where the respective advance values $(-\Delta\theta_{n-(k-1)}, \ldots, -\Delta\theta_{n-1}, -\Delta\theta_n)$ in k cylinders are lower than the respective ignition retard control amounts in the other cylinders among the plurality of cylinders. In the following description, the average value of the respective advance values in k cylinders will be referred to as "index value".

Figure 2:
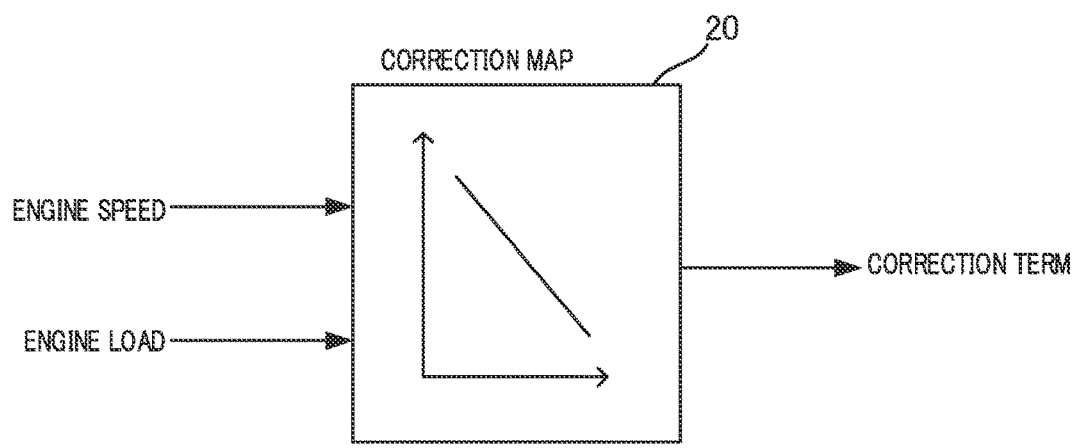
FIG. 2 illustrates an exemplary configuration of an index value correction unit.

FIG. 2 illustrates an exemplary configuration of index value correction unit 13.

Index value correction unit 13 calculates, based on the operation state (engine speed and engine load), a correction term for the index value (average value) by referring to correction map 20. Correction map 20 is a map indicating the relationship of the engine speed and the engine load with the correction amount, and can be obtained by means of experiments and/or simulations. The correction term is a parameter for modifying an index value (average value) at the time of the acquisition of the operation state (engine speed and engine load) to an index value of an operation state used as a reference (engine speed: 1000 rpm, engine load: 100 Nm).

Figure 3:
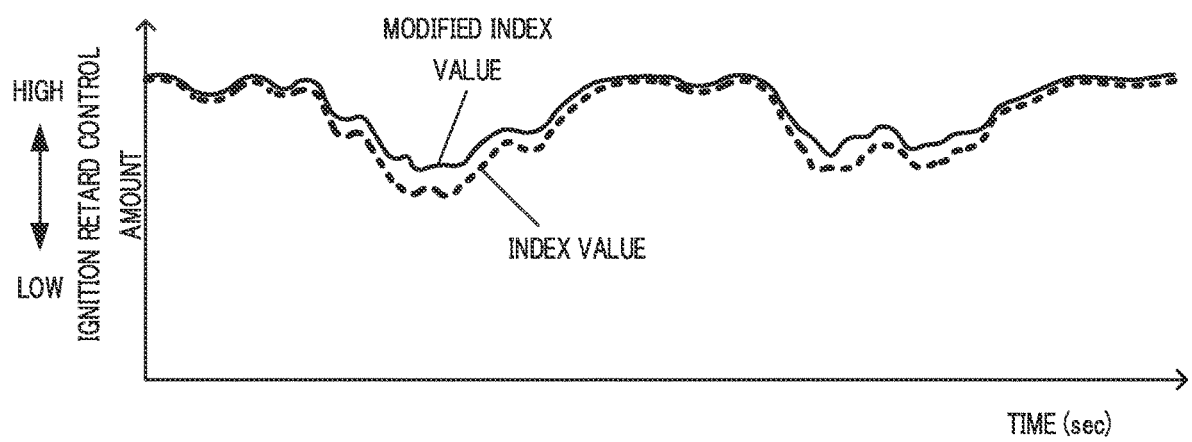
FIG. 3 illustrates an exemplary index value, which indicates an ignition retard control amount in a cylinder, and an exemplary modified index value.

FIG. 3 illustrates an exemplary index value (average value), which indicates an ignition retard control amount in a cylinder, and an exemplary modified index value.

Index value correction unit 13 calculates the modified index value by adding the correction term to the index value (average value).

Estimation unit 14 estimates, based on the calculated modified index value, the methane number of the LNG fuel by referring to a predetermined conversion table. Here, the conversion table refers to a table indicating the relationship between the modified index value and the methane number.

In a case where an estimated methane number decreases to a value equal to or less than a threshold and engine 1 is in a high-load state, control unit 15 controls the respective isolation valves of the LNG fuel supply system and the CNG fuel supply system such that the LNG fuel supply path is closed and the CNG fuel supply path is opened. Since switching from the LNG fuel to the CNG fuel is performed thereby, it is possible to suppress occurrence of excessive knocking and occurrence of engine malfunction. Further, control unit 15 controls a display unit (not illustrated) such that the display unit displays that the methane number of the LNG fuel decreases to a value equal to or less than the threshold. As a result, the LNG tank is filled with a new LNG fuel by the user.

Figure 4:
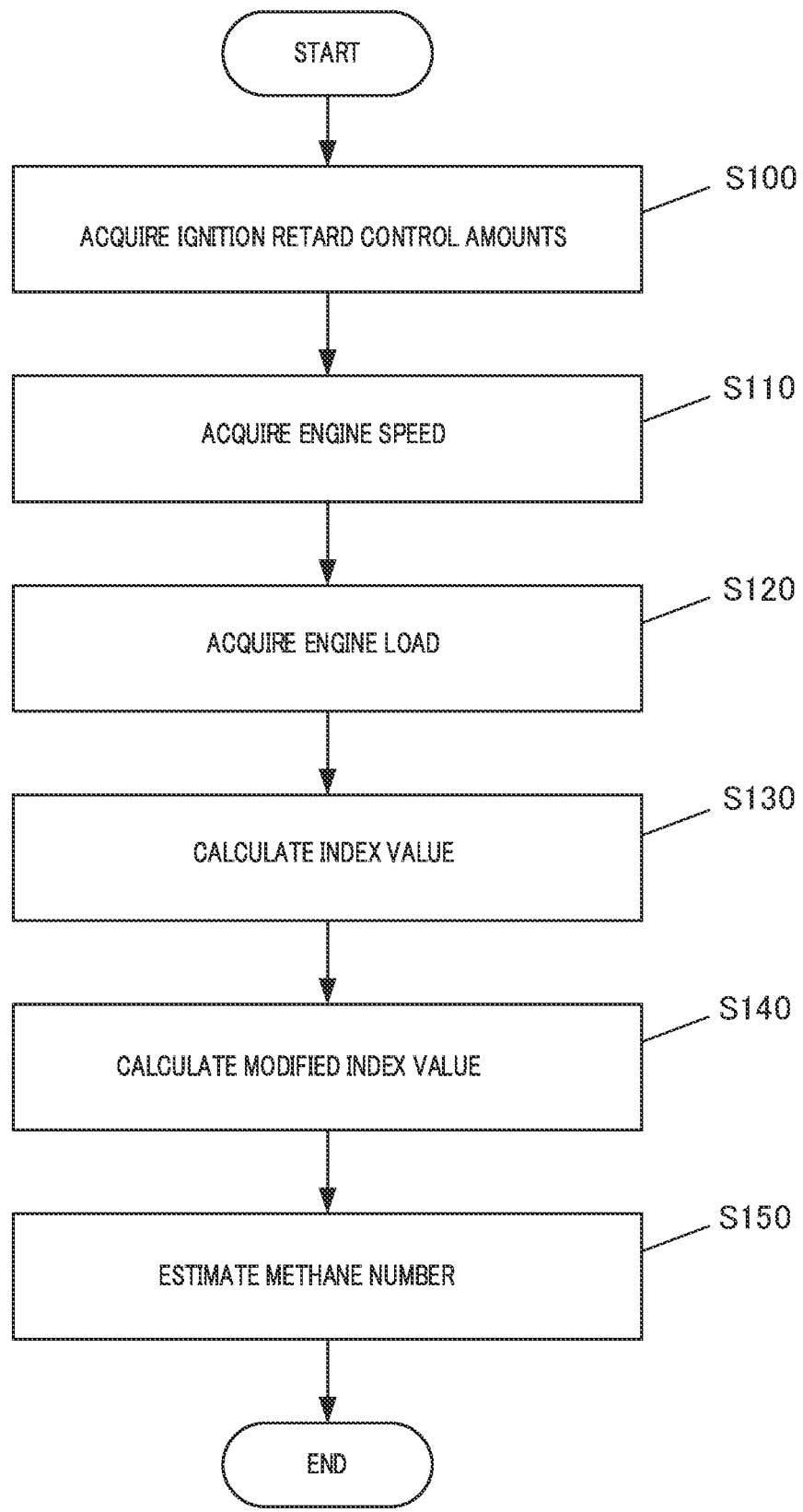
FIG. 4 is a flowchart illustrating exemplary operations of the engine control apparatus.

Next, exemplary operations of engine control apparatus 10 will be described with reference to FIG. 4. FIG. 4 is a flowchart illustrating exemplary operations of engine control apparatus 10. This flow starts after the start of engine 1 and is executed for each predetermined time during the operation of engine 1. Note that, the following description will be made on the assumption that ECU 100 performs each mechanism of control apparatus 10.

First, in step S100, ECU 100 acquires advance values (ignition retard control amounts).

Next, in step S110, ECU 100 acquires the engine speed from crank angle sensor 3.

Next, in step S120, ECU 100 acquires the engine load from torque sensor 4.

Next, in step S130, ECU 100 calculates an average value (calculates an index value) of, among the acquired respective advance values (ignition retard control amounts) in the plurality of cylinders, the respective advance values in two or more cylinders, where the respective advance values in the two or more cylinders are lower than the (respective) advance value(s) in the other cylinder(s) among the plurality of cylinders.

Next, in step S140, ECU 100 calculates, based on the engine speed and the engine load, the correction term for the index value by referring to the correction map, and calculates the modified index value by adding the calculated correction term to the index value.

Next, in step S150, ECU 100 estimates, based on the calculated modified index value, the methane number of the LNG fuel by referring to the predetermined conversion table. Thereafter, the flow illustrated in FIG. 4 ends.

Engine control apparatus 10 according to the embodiment of the present disclosure is engine control apparatus 10 for engine 1 in which an LNG fuel as a fuel is allowed to be used, and engine control apparatus 10 includes: acquisition unit 11 that acquires an ignition retard control amount for avoiding knocking in engine 1; and estimation unit 14 that estimates, based on an index value indicating the acquired ignition retard control amount, a methane number of the liquefied natural gas.

With the configuration described above, it is possible to set a more appropriate ignition advance based on the estimated methane number, and thus, it is possible to suppress occurrence of excessive knocking and occurrence of engine malfunction. Further, it is possible to maintain the performance of engine 1 in an appropriate state.

In addition, in engine control apparatus 10 according to the embodiment of the present disclosure, acquisition unit 11 acquires a plurality of advance values (ignition retard control amounts) in a plurality of cylinders, respectively, and engine control apparatus 10 further includes index value calculation unit 12 that calculates, as the index value, an average value of two or more advance values in two or more cylinders, respectively, among the acquired plurality of advance values respectively in the plurality of cylinders, where each of the two or more advance values is lower than one or more of the acquired plurality of advance values, respectively in one or more of the plurality of cylinders, other than the two or more cylinders. Since it is possible to surely detect a property change in the LNG fuel thereby, it is possible to improve the certainty of detecting a decrease in the methane number.

In addition, engine control apparatus 10 according to the embodiment of the present disclosure further includes index value correction unit 13 that corrects the index value based on an engine speed and an engine load, and control unit 15 estimates the methane number of the LNG fuel based on the modified index value corrected by index value correction unit 13. Accordingly, the index value is standardized, and thus, the accuracy of the estimation of the methane number can be improved.

Note that, in the embodiment disclosed above, ECU 100 acquires the engine load from torque sensor 4, but the present disclosure is not limited thereto. For example, ECU 100 may estimate the engine load based on the intake manifold pressure. In this case, the intake manifold pressure is detected by a pressure sensor.

In addition, any of the embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

The present application is based on a Japanese Patent Application (Japanese Patent Application No. 2021-170414), filed on Oct. 18, 2021, the content of which is incorporated herein by reference.

INDUSTRIAL APPLICABILITY

The present disclosure is suitably utilized in a vehicle including a control apparatus required to estimate the methane number of an LNG fuel.

REFERENCE SIGNS LIST

1 Engine
2 Knock sensor
3 Crank angle sensor
4 Torque sensor
10 Control apparatus
11 Acquisition unit
12 Index value calculation unit
13 Index value correction unit
14 Estimation unit
15 Control unit
20 Correction map
100 ECU

The invention claimed is:

1. An engine control apparatus for an engine, the engine being an engine in which liquefied natural gas as a fuel is allowed to be used, the engine control apparatus comprising a processor,
    wherein the processor is configured to:
        acquire a plurality of ignition retard control amounts for avoiding knocking in the engine in a plurality of cylinders, respectively, the plurality of cylinders being included in the engine;
        calculate, as an index value, an average value of two or more ignition retard control amounts in two or more cylinders, respectively, among the acquired plurality of ignition retard control amounts respectively in the plurality of cylinders, each of the two or more ignition retard control amounts being lower than one or more of the acquired plurality of ignition retard control amounts, respectively, in one or more of the plurality of cylinders, other than the two or more cylinders;
        estimate, based on the index value indicating the acquired ignition retard control amount, a methane number of the liquefied natural gas; and
        control the engine based on the methane number.

2. The engine control apparatus according to claim 1, wherein the processor is further configured to:
    correct the index value based on an engine speed and an engine load; and
    estimate the methane number of the liquefied natural gas based on the corrected index value.

3. A vehicle comprising the engine control apparatus according to claim 1.

* * * * *